E. H. CALLAWAY.
VALVE FOR THE AIR DUCTS OF BRICK KILNS AND THE LIKE.
APPLICATION FILED DEC. 17, 1907.
917,710.
Patented Apr. 6, 1909.
2 SHEETS—SHEET 1.
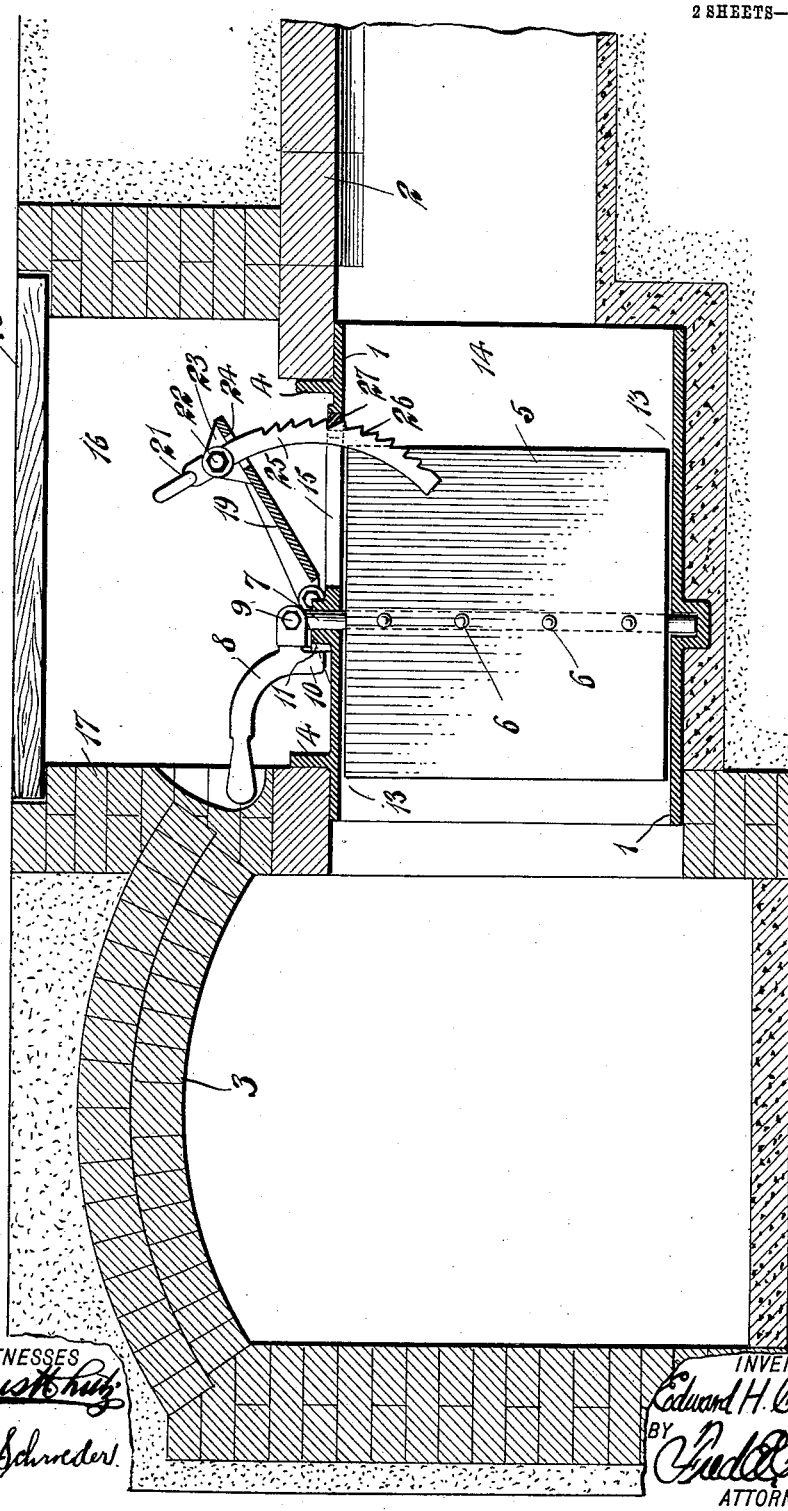

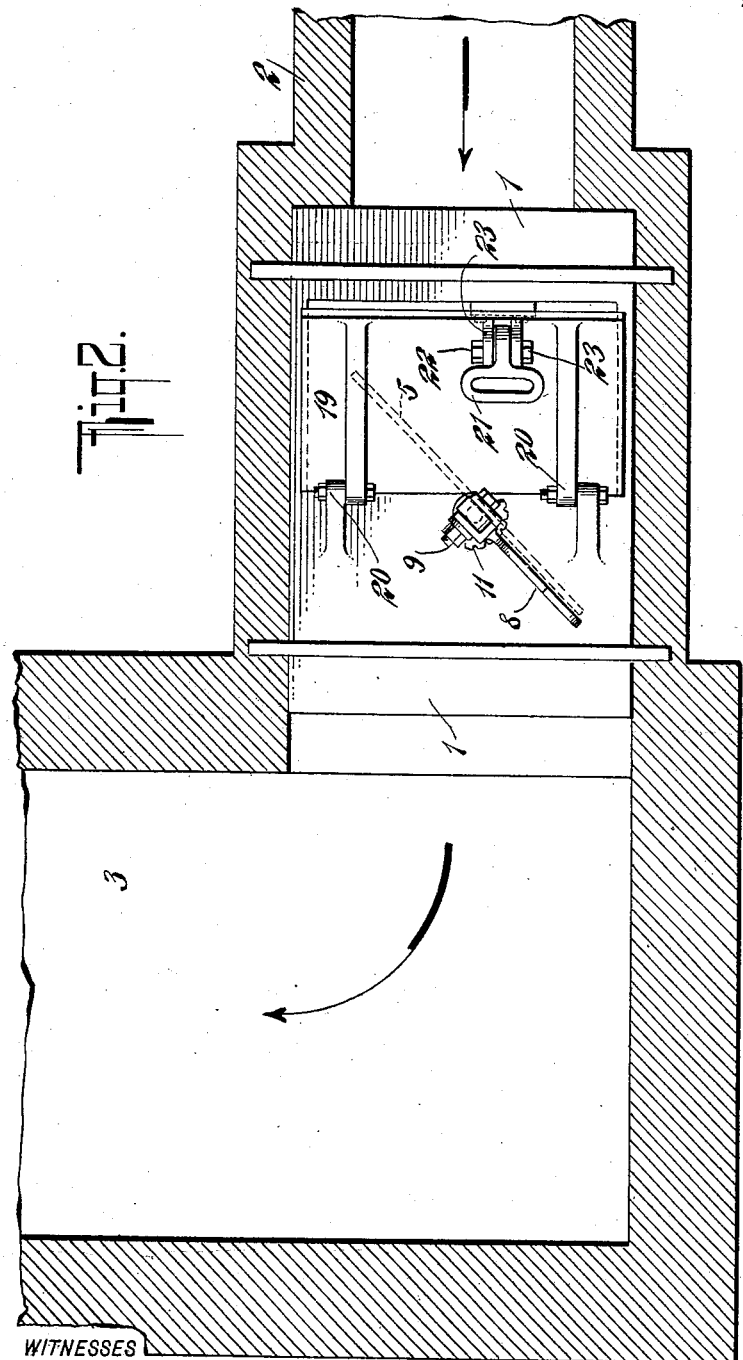

UNITED STATES PATENT OFFICE.

EDWARD H. CALLAWAY, OF WESTFIELD, NEW JERSEY, ASSIGNOR TO THE AMERICAN CLAY MACHINERY COMPANY, OF BUCYRUS, OHIO, A CORPORATION OF OHIO.

VALVE FOR THE AIR-DUCTS OF BRICK-KILNS AND THE LIKE.

No. 917,710.  Specification of Letters Patent.  Patented April 6, 1909.

Application filed December 17, 1907. Serial No. 406,930.

*To all whom it may concern:*

Be it known that I, EDWARD H. CALLAWAY, a citizen of the United States of America, and a resident of Westfield, Union county, State of New Jersey, have invented certain new and useful Improvements in Valves for the Air-Ducts of Brick-Kilns and the Like, of which the following is a specification.

This invention relates to a valve or damper device employed with the air or draft ducts or passages of brick-kilns, and driers, using a forced draft or powerful air current for bringing about the best results in the way of combustion, etc.

The object of the invention is to provide means for admitting a greater or less amount of atmospheric air into the valve chamber or into the duct, in order to permit of an inflow of the requisite quantity of cold air to be mixed with the hot air in that part of the valve casing or duct which may be termed a mixing chamber.

The invention consists in the means for admitting the atmospheric air when combined with the means for controlling the passage of the air through the duct, and with the mixing chamber, and in various details and peculiarities in the construction, arrangement and combination of parts substantially as will be hereinafter described and claimed.

In the annexed drawing illustrating my invention, Figure 1 is a vertical section of my improved valve device for brick-kiln ducts and the like, the main duct and the branch duct to the kiln being shown also. Fig. 2 is a top plan view of the valve device with the duct in section.

Similar characters of reference designate like parts throughout all the figures of the drawing.

1 denotes a pipe section serving as a valve casing, and being of rectangular form, or substantially so. It is arranged with and forms a part of a subterranean brick-kiln duct 2, which leads from the main duct 3 to a kiln or furnace, said duct 2 being commonly called a waste heat duct for carrying off the waste heat from the kiln, it being conveyed through the main duct 3 to the drier. Said casing 1 is preferably furnished with flanges 4 to anchor it in the wall or masonry constituting duct 2. Casing 1 is of a substantially rectangular shape for a purpose which will be clearly seen when the corresponding shape of the valve itself is observed, and said casing 1 may be made to vary in size, being larger or smaller as may be required. As the duct of which it forms a part conveys air under very strong pressure, it is of the highest importance that proper means be provided for enabling the draft to be cut off and the flow of the air to be regulated through the valve casing and through the duct. This part of my invention, however, is fully set forth and claimed in my copending application for improvements in valves for the air ducts of brick-kilns and the like, filed April 15, 1907, Serial No. 368,260, wherein I have described the rectangular casing, the rectangular valve, the latter being eccentrically pivoted, means for seating said valve properly, and means for locking it in any desired position. Said parts, therefore, as given herein are offered simply by way of example, in order to explain the adaptability of the features which make up the present invention.

Referring to what is shown herein, corresponding to the valve device of the other application, I mention not only the casing 1, but the rectangular valve 5 which is a neatly fitting plate or shutter and is adapted to lie across the passage in the casing 1, or the duct, so as to completely obstruct the passage of the air, and being capable of being turned to a greater or less angle. The valve 5 is secured by means of bolts 6, or other devices, to a vertical rod 7 which is journaled at top and bottom in the casing 1. Its upper end projects outside of and above the casing 1 to provide a part to which an operating handle 8 may be pivoted by means of a bolt 9. The handle 8 is also provided with a depending tooth 10 adapted to engage notches 11 in a segment which is cast as an integral boss on top of the casing 1, or is secured thereto as an independent piece, or is otherwise located in some position which is stationary relatively to a rotatable pivot rod 7; see Fig. 2. On the inside wall of the casing 1 are cast integral ledges or ribs in any suitable way, as at 13, to serve as stops against which the unequal portions of the valve on opposite sides of the pivot rod may properly seat when the valve is closed, in order to make a tight joint and to prevent the passage of any air at that time. In my other co-pending application, it is particularly noted that the division of the valve, by means of the eccentrically located pivot pin, into two unequal parts enables the part which is exposed to the strong air pressure to be pressed much more tightly against its seat than it would be possible if the pivot device were in the center of the valve, the wider part of the valve being exposed to the greater air pressure.

The interior of the valve casing 1, wherein is the valve 5, forms a chamber 14, which I term a mixing chamber. In the wall of the casing 1, preferably in the top side thereof, is an opening extending across the area of the same, being preferably of substantial size 15, which has the function of admitting air into the casing, usually cold atmospheric air, which is taken directly from the atmosphere. By referring to Fig. 1, where the ducts are seen to be located at some little distance below the surface of the ground, there is a depression or subterranean fresh-air box or chamber 16 below the ground surface and above the valve casing 1, said chamber being inclosed by a wall 17 and having a board or other cover 18 flush with the surface of the ground. This cover 18 can be entirely removed when desired, in order to allow the atmospheric air to more freely fill the chamber 16. Ordinarily, however, chamber 16 will admit and contain enough air for its purpose without removing cover 18. The cold air in chamber 16 passes readily through the opening 15 into the valve casing 14 and the connected duct. This inlet opening 15 is provided with a cover 19, hinged to the outside of the casing 1 by means of suitable hinges 20 so as to swing on an axis at right angles to that of the valve below. Cover 19 is provided with a handle 21 pivoted by means of a bolt 22 between ears or flanges 23 on the cover 19 near the front edge of the same. The cover between the ears 23 is slotted at 24, and the handle 21 is made integral with a curved arm 25 which projects downwardly through the slot 24 and oscillates therein when the handle is moved, said curved arm being toothed or serrated at 26 to engage the edge 27 of the opening 15. If desired, this edge 27 may have an inserted piece to form a tooth or projecting lip for the easier engagement with the teeth 26 of the curved arm 25. By laying hold of the handle 21, the cover 19 can be lifted to a greater or less extent as may be desired, to allow the proper inflow of air, and then by properly manipulating said handle 21 the curved dentated arm 25 will be brought into engagement with the edge 27 of the opening 15, and will prop open the cover 19 and hold it there as long as may be desired.

The heat of the air in the duct 2, which is passing to the main duct 3, is often intense, being sometimes as high as from 2,000 to 2,500 degrees F. and the effect of such intensely hot air on the valve device and its metal parts is deleterious in a serious degree, warping, twisting, and even melting them so that the valve device is likely to have great difficulty in withstanding the damaging effects of the hot air. Hence, it becomes necessary to provide some means of lowering the temperature, and this I accomplish by admitting the proper supply of atmospheric air, or air at ordinary atmospheric temperature. The inflow of an amount of air at a low temperature exerts a cooling influence over the hot air, and the mixture of the cold air and the hot air in the mixing chamber 14 diminishes the temperature to such an extent that the resultant air passes through the valve and into the main duct and on to the drier or elsewhere in a comfortable workable condition, and at a temperature which is not too hot, but of a proper degree to enable the best results to be brought about without any damaging effects. If it is found that the hot air from the kiln needs only a slight cooling, then the air inlet 15 will be only opened a little; but if the kiln heat is extreme, the cover 19 will be thrown wide open and a large amount of cold air introduced.

Many changes in the precise construction, combination and arrangement of the various parts may be made without going outside of my invention, and I reserve the liberty of so modifying, re-arranging and re-adapting the details as may be found best suited to bring about the most favorable and successful practice.

Having thus described my invention, what I claim as new and desire to secure by Letters Patent, is:—

1. In a valve device for the air draft of kilns, driers, and the like, the combination with the duct, of a valve casing having an atmospheric air inlet, means for controlling the passage of the heated air through said valve casing, said means consisting essentially of a valve pivoted off the center, means for holding said valve in any desired position, a fresh air chamber for introducing atmospheric air into the casing, a hinged cover controlling the opening in the side of the valve casing for allowing atmospheric air to be admitted into the valve casing, and means located in connection with said cover and consisting essentially of a handle and a serrated arm for holding the cover open to the required extent.

2. In a valve or damper for the air draft of kilns, driers, and the like, the combination with the duct, of the mixing chamber, a valve pivoted off the center and controlling the passage of the hot air, an inside cover hinged outside the mixing chamber and beneath an outside cover for admitting atmospheric air thereinto, said hinged cover being provided with a handle and a serrated arm which latter holds the cover open to the required extent.

3. In a valve device for the air draft of kilns, driers, and the like, the combination with the duct, a rectangular casing therein having an atmospheric air inlet, a rectangular valve within the casing which valve is eccentrically pivoted, stop devices for the said valve, locking means for holding the valve in any desired position, a hinged cover for the atmospheric inlet, means for holding said cover in any desired position.

4. In a valve or damper for kilns and the like, an air mixing and cooling device, consisting in the combination with a subterranean hot air duct leading to the drier, of a rectangular valve casing in said duct having a lateral atmospheric air inlet, a rectangular valve within the casing which valve is eccentrically pivoted, locking means for holding the valve in any desired position, a fresh air chamber above said valve casing, and a hinged cover on the valve casing for admitting air from the fresh air chamber into the duct, together with means for holding said hinged cover in any desired position.

5. An air mixing device for drying bricks and like articles, which consists in the combination with a hot air duct leading to the drying chamber, of a valve casing, a valve located in the casing and controlling the passage of air through said duct, stop devices for said valve, locking means for holding the valve in any desired position, a fresh air box located over said valve and in communication with the casing, and an adjustable door commanding the passage between the fresh air box and the interior of the valve casing so that a greater or less amount of atmospheric air may be introduced into the valve casing for the purpose of regulating the temperature of the hot air passing through said casing.

Signed at New York city, this 2nd day of December, 1907.

EDWARD H. CALLAWAY.

Witnesses:
    JOHN H. HAZELTON,
    C. B. SCHROEDER